United States Patent [19]

Evers et al.

[11] 3,857,972
[45] Dec. 31, 1974

[54] FLAVORING WITH AN OXOCYCLIC PYRIMIDINE

[75] Inventors: William J. Evers, Atlantic Highlands; Joseph Sieczkowski, Matawan, both of N.J.

[73] Assignee: International Flavors & Fragrance Inc., New York, N.Y.

[22] Filed: Jan. 22, 1973

[21] Appl. No.: 325,674

Related U.S. Application Data

[62] Division of Ser. No. 123,024, March 10, 1971, abandoned.

[52] U.S. Cl............ 426/65, 426/175, 426/217, 131/17, 260/251 A
[51] Int. Cl............................................ A23l 1/26
[58] Field of Search .......... 426/65, 175; 260/251 A

[56] References Cited
UNITED STATES PATENTS

| | | | |
|---|---|---|---|
| 3,684,809 | 8/1972 | Mookherjee | 426/65 X |
| 3,705,158 | 12/1972 | Pittet et al. | 426/65 X |
| 3,726,692 | 4/1973 | Katz et al. | 426/65 |
| 3,764,349 | 10/1973 | Mookherjee | 426/65 |

*Primary Examiner*—Joseph M. Golian
*Attorney, Agent, or Firm*—Brooks Haidt & Haffner

[57] ABSTRACT

Processes for altering the flavors of consumable products, including foodstuffs and tobaccos, which comprise adding thereto a small but effective amount of at least one oxocyclic pyrimidine having the formula

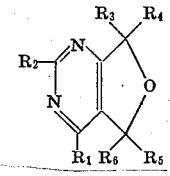

wherein $R_1$ is alkyl, halogen or hydrogen and $R_2$, $R_3$, $R_4$, $R_5$ and $R_6$ are the same or different and are hydrogen or alkyl; flavoring and flavor-enhancing compositions containing such oxocyclic pyrimidines; and novel oxocyclic pryimidines and processes for the preparation of such oxocyclic pyrimidines.

4 Claims, No Drawings

FLAVORING WITH AN OXOCYCLIC PYRIMIDINE

This application is a divisional application of application Ser. No. 123,024 filed Mar. 10, 1971 now abandoned.

The present invention relates to oxocyclic pyrimidines and their use in processes and compositions for altering the flavors of various materials such as tobaccos, foodstuffs, and the like, as well as the novel pyrimidines and processes for producing them.

It has now been found that certain novel oxocyclic pyrimidines are capable of imparting a wide variety of flavors to various consumable materials. Briefly, the invention contemplates altering the flavors of such consumable materials by adding thereto a small but effective amount of at least one oxocyclic pyrimidine having the formula

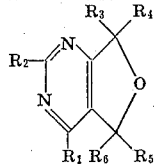

wherein $R_1$ is alkyl, halogen or hydrogen and $R_2$, $R_3$, $R_4$, $R_5$ and $R_6$ are the same or different and are hydrogen or alkyl. The invention also contemplates flavoring and flavor-enhancing compositions containing such oxocyclic pyrimidines, as well as the novel pyrimidines and the processes for preparing them.

More specifically, the oxocyclic pyrimidines according to this invention are pyrimidines to the "d" side of which are fused a five-membered tetrahydrofuran ring. The oxygen-containing ring can be substituted with one or more alkyl groups, and the pyrimidine ring can also be substituted with one or two alkyl groups or with a halogen substituent. The substituents on the oxygen-containing ring can, in some cases, be geminal. It is preferred in practicing the present invention that the substituent or substituents be hydrogen or a lower alkyl group, particularly alkyl groups containing from one to six carbon atoms, and preferably alkyl groups containing from one to four carbon atoms. The halogen substituents are preferably chloro, bromo, or iodo.

Exemplary of the oxocyclic pyrimidines contemplated herein is 2-methyl-5,7-dihydrofuro-[3,4-d]-pyrimidine having the structure.

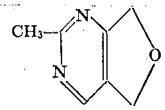

This is a white solid with a popcorn-like odor and a sweet popcorn flavor.

Another material according to the present invention is 2,7-dimethyl-5,7-dihydrofuro-[3,4-d]-pyrimidine having the structure

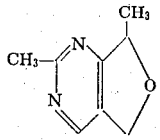

This is a colorless liquid having a popcorn-cracker aroma and taste.

Still another material according to the present invention is 2,5,7-trimethyl-5,7-dihydrofuro-[3,4-d]-pyrimidine having the structure

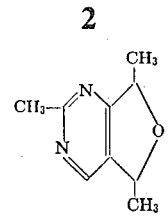

This is a colorless liquid with a sweet cereal note.

Other novel materials prepared according to the present invention are 2-methyl-4-chloro-5,7-dihydrofuro-[3,4-d]-pyrimidine; 2,7-dimethyl-4-chloro-5,7-dihydrofuro-[3,4-d]-pyrimidine and 2,5,7-trimethyl-4-chloro-5,7-dihydrofuro-[3,4,-d]-pyrimidine. These novel materials are all useful intermediates in the production of the other novel oxocyclic pyrimidines of the present invention.

The novel oxocyclic pyrimidines prepared according to the present invention can be obtained by reacting a carboalkoxytetrahydrofuranone with acetamidine hydrochloride in the presence of a suitable base in a suitable solvent to form the alkylhydroxy dihydrofuropyrimidine. Suitable bases include alkali metal hydroxides, carbonates and alkoxides such as potassium carbonate, sodium ethoxide and sodium hydroxide. Suitable solvents include lower alkanols such as ethanol and the like, water and mixtures thereof. The reaction preferably takes place at room temperature over a period of from about 17 to 97 hours.

The addition of a halogenating agent to the alkylhydroxy dihydrofuropyrimidine under reflux conditions results in the formation of the corresponding alkylchloro dihydrofuropyrimidine. Suitable halogenating agents include phosphorus oxychloride and the like.

The alkylchloro dihydrofuropyrimidine can be converted by a reductive dehalogenation to the corresponding alkyl dihydrofuropyrimidine. This reaction is carried out under reflux conditions in the presence of a reductive dechlorination reagent such as ammonium chloride and zinc dust.

It will be understood according to the present invention that the intermediate and the final products prepared herein can be neutralized, washed, and dried to purify and cleanse the desired substances. The oxocyclic pyrimidines can be obtained in purer form or in substantially pure form by conventional purification techniques. Thus, the products can be purified and/or isolated by distillation, extraction, crystallization, preparative chromatographic techniques, and the like.

It will be appreciated from the present disclosure that the oxocyclic pyrimidines and mixtures thereof according to the present invention can be used to alter, vary, fortify, modify, enhance, or otherwise improve the flavor of a wide variety of materials which are ingested, consumed, or otherwise organoleptically sensed. The term "alter" in its various forms will be understood herein to mean the supplying or imparting flavor character or note to an otherwise bland, relatively tasteless substance, or augmenting an existing flavor characteristic where the natural flavor is deficient in some regard, or supplementing the existing flavor impression to modify organoleptic character.

Such pyrimidines are accordingly useful in flavoring compositions. Such a composition is taken to mean one which contributes a part of the overall flavor impression by supplementing or fortifying a natural or artificial flavor in a material, as well as one which supplies substantially all the flavor and/or aroma character to a consumable article. The oxocyclic pyrimidines of our invention are particularly useful in adding sweetness and nut notes to artificial essential oils, peppermint oil and spearmint oil. They are also suitable for rounding out and improving the character of nut, bread, and vanilla flavoring compositions.

The term "foodstuff" as used herein includes both solid and liquid ingestible materials for man or animals, which materials usually do, but need not, have nutritional value. Thus, foodstuffs includes meats, gravies, soups, convenience foods, malt and other alcoholic or non-alcoholic beverages, milk and dairy products, nut butters such as peanut butter and other spreads, seafoods including fish, crustaceans, molluscs and the like, candies, breakfast foods, baked goods, vegetables, cereals, soft drinks, snack foods, dog or cat foods, other veterinary products, and the like.

The term "tobacco" will be understood herein to mean natural products such as, for example, burley, Turkish tobacco, Maryland tobacco, flue-cured tobacco and the like including tobacco-like or tobacco-based products such as reconstituted or homogenized leaf and the like, as well as tobacco substitutes intended to replace natural tobacco, such as lettuce and cabbage leaves and the like. The tobaccos and tobacco products include those designed or used for smoking such as in cigarette, cigar, and pipe tobacco, as well as products as snuff, chewing tobacco, and the like.

The term "consumable material" includes both foodstuffs and tobaccos.

When the oxocyclic pyrimidines according to this invention are used in a flavoring composition, they can be combined with conventional flavoring materials or adjuvants. Such co-ingredients or flavoring adjuvants are well known in the art for such use and have been extensively described in the literature. Apart from the requirement that any such adjuvant material be ingestibly acceptable, and thus non-toxic or otherwise non-deleterious, conventional materials can be used and broadly include other flavor materials, vehicles, stabilizers, thickeners, surface active agents, conditioners and flavor intensifiers.

Such conventional flavoring materials include saturated and unsaturated fatty and amino acids; alcohols, including primary and secondary alcohols; esters; carbonyl compounds including ketones and aldehydes; lactones; other cyclic organic materials including benzene derivatives, alicycles, heterocyclics, such as furans, pyridines, pyrazines and the like, sulfar-containing materials including thiols, sulfides, disulfides and the like; proteins; lipids; carbohydrates; so-called flavor potentiators such as monosodium glutamate, guanylates, and inosinates; natural flavoring materials such as cocoa, vanilla, and caramel; essential oils and extracts such as anise oil, clove oil and the like, artificial flavoring materials such as vanillin; and the like.

Stabilizers include preservatives such as sodium chloride, and the like, antioxidants such as calcium and sodium ascorbate, ascorbic acid, butylated hydroxyanisole, butylated hydroxytoluene, propyl gallate and the like, sequestrants such as citric acid, EDTA, phosphates and the like.

Thickeners include carriers, binders, protective colloids, suspending agents, emulsifiers and the like, such as agar-agar, carrageenan, cellulose and cellulose derivatives such as carboxymethyl cellulose and methyl cellulose, natural and synthetic gums such as gum arabic, gum tragacanth and the like, and other proteinaceous materials, lipids, carbohydrates, starches and pectins.

Surface active agents include emulsifying agents such as mono-and/or diglycerides of fatty acids such as capric acid, caprylic acid, palmitic acid, myristic acid, oleic acid, and the like; lecithin; defoaming and flavor-dispersing agents such as sorbitan monostearate, potassium stearate, hydrogenated tallow alcohol, and the like.

Conditioners include compounds such as bleaching and maturing agents such as benzoyl peroxide, calcium peroxide, hydrogen peroxide and the like; starch modifiers such as peracetic acid, sodium chlorite, sodium hypochlorite, propylene oxide, succinic anhydride and the like; buffers and neutralizing agents such as sodium acetate, ammonium bicarbonate, ammonium phosphate, citric acid, lactric acid, vinegar and the like; colorants such as carminic acid, cochineal, turmeric, curcumin, approved food and drug dyes, and the like; firming agents such as aluminum sodium sulfate, calcium chloride and calcium gluconate; texturizers; anticaking agents such as aluminum calcium sulfate and tribasic calcium phosphate; enzymes; yeast foods such as calcium lactate and calcium sulfate; nutrient supplements such as iron salts, such as ferric phosphate, ferric pyrophosphate, ferrous gluconate and the like; riboflavin; vitamins; zinc sources such as zinc chloride, zinc sulfate, and the like.

The oxocyclic pyrimidines, or the compositions incorporating them, as mentioned above, can be combined with one or more vehicles or carriers for adding them to the particular product. Vehicles can be edible or otherwise suitable materials such as ethyl alcohol, propylene glycol, water and the like. Carriers include materials such as gum arabic, carrageenan, other gums, and the like. The pyrimidines can be incorporated with the carriers by conventional means such as spray-drying, drum-drying, and the like. Such carriers can also include materials for coacervating the pyrimidines (and other flavoring ingredients, as present) to provide encapsulated products. When the carrier is an emulsion, the flavoring composition can also contain emulsifiers such as mono- and diglycerides of fatty acids and the like. With these carriers or vehicles, the desired physical form of the composition can be prepared.

It will be understood by those skilled in the art that the oxocyclic pyrimidines can be added to the materials to be flavored at any convenient point in the production of the finished product. Thus, when the pyrimidines are used to alter or otherwise vary the flavor of a foodstuff, they can be added in the original mixture, dough, emulsion, batter, or the like to any cooking or heating operation. Alternatively they can be added at a later stage of processing if volatilization losses would be excessive during the earlier processing.

When the materials are used to treat tobacco products, for example, the additive can be applied in a suitable manner, as by spraying, dipping, or otherwise. The pyrimidines can be applied during the "casing" or final spray treatment of the tobacco, or they can be applied at some earlier stage of curing or preparation. The quantity of pyrimidines of mixtures thereof utilized should be sufficient to impart the desired flavor characteristic to the product but on the other hand, the use of an excessive amount of the pyrimidines is not only wasteful and uneconomical but in some instances too large a quantity may unbalance the flavor of other organoleptic property of the product consumed. The quantity used will vary depending upon the ultimate foodstuff, tobacco product, or other consumable product; the amount and type of flavor initially present in the product; the further process or treatment steps to which the product will be subjected; regional and other preference factors; the type of storage, if any, to which the product will be subjected; and the preconsumption treatment, such as baking, frying and so on, given to the product by the ultimate consumer. Accordingly, the terminology "effective amount" and "sufficient amount" is understood in the context of the present invention to be quantitively adequate to alter the flavor of the foodstuff, tobacco, or other consumable material.

It is accordingly preferred that the ultimate compositions contain from about 0.0001 parts per million (ppm) to about 200 ppm of the oxocyclic pyrimidines. More particularly, in food compositions it is desirable to use from about 0.0001 to about 200 ppm for enhancing flavors and in certain preferred embodiments of the invention, from about 0.01 to about 15 ppm of the pyrimidines are included to add positive flavors to the finished product. On the other hand, tobacco compositions can contain as little as 0.01 ppm and as much as 100 ppm depending upon whether a cigarette tobacco, a pipe tobacco, a cigar tobacco, a chewing tobacco, or snuff is being prepared. The amounts of oxocyclic pyrimidines to be utilized depend on many factors including the particular oxocyclic pyrimidines utilized, the desired flavor, other ingredients present, its ultimate use and the like.

The amount of oxocyclic pyrimidine or pyrimidines to be utilized in flavoring compositions can be varied over a wide range depending upon the particular quality to be added to the foodstuff, tobacco, or other consumable material. Thus, amounts of one or more oxocyclic pyrimidines according to the present invention from about 0.1 percent up to 80 or 90 percent can be incorporated in such compositions. It is generally found to be desirable to include from about 0.5 to about 25 percent of the oxocyclic pyrimidines in such compositions.

All parts, proportions, ratios and percentages in this specification are by weight unless otherwise stated.

The following examples are given to illustrate embodiments of the invention as it is presently preferred to practice it. It will be understood that these examples are illustrative, and the invention is not to be considered as restricted thereto except as indicated in the appended claims.

EXAMPLE I

Preparation of 2-methyl-5,7-dihydrofuro-[3,4-d]-pyrimidine a. Preparation of 2-methyl-4-hydroxy-5,7-dihydrofuro-[3,4-d]-pyrimidine A mixture is prepared by combining 8.95 g. (0.060 mol) of 3-carbomethoxytetrahydrofuran-4-one, 5.95 g. (0.063 mol) of acetamidine hydrochloride, 4.35 g. (0.315 mol) of potassium carbonate and 87 ml. of 95 percent ethanol and the mixture is permitted to stand at room temperature for 97 hours. At the end of this period, the ethanol is removed in vacuo and 10 ml. of water are added and the mixture is extracted thrice with 10 ml. portions of dichloromethane. The extract is then dried over sodium sulfate, filtered and the dichloromethane is removed in vacuo. 3-Carbomethoxytetrahydrofuran-4-one and side products are removed by distillation (74°–90°/0.3 mm) leaving a residue which upon recrystallization from benzene yields 0.12 of product. The water-residue mixture is adjusted to a pH of 6 with 3N sulfuric acid, extracted thrice with 10 ml. portions of dichloromethane and treated as above to yield an additional 0.07 g. of product which results in a total yield of 0.19 g. of a solid with melting point of 255°–275°C. IR (Nujol) shows adsorptions at 5.92, 6.24, 6.32, 9.55, 10.90, 11.16, 13.12 and 13.57 $\mu$; mass spectroscopy (70 ev) m/e (decreasing relative intensity):151, 152, 124, 42 and 55 mass units; NMR in deuterochloroform shows 5.06 (2, $t$, J=4 cps,

4.90 (2, $t$, J=4 cps,

2.50 $\beta$, $s$,

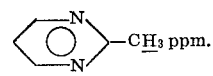 ppm.

These data confirm that this material is 2-methyl-4-hydroxy-5,7-dihydrofuro-[3,4-d]-pyrimidine.

b. Preparation of 2-methyl-4-chloro-5,7-dihydrofuro-[3,4-d]-pyrimidine

A mixture of 0.17 g. (0.00112 mol) of 2-methyl-4-hydroxy-5,7-dihydrofuro-[3,4-d]-pyrimidine and 1.0 ml. of phosphorus oxychloride is heated at reflux for 110 minutes and then added to 10 g. of ice. The mixture is first adjusted to a pH of 3 by the addition of 50 percent sodium hydroxide and then to a pH of 6 by the addition of a saturated sodium bicarbonate solution. The water mixture is saturated with sodium chloride and extracted thrice with 15 ml. portions of dichloromethane. The extract is dried over sodium sulfate, filtered and the dichloromethane is removed in vacuo to give 0.12 g. of residue. Sublimination of this residue at 0.1 to 0.3 mm pressure at room temperature gives 25 mg. of product. The pot residue is then chromatographed on silica gel with 1 percent methanol in dichloromethane as an eluent to give 50 mg. of product for a total yield of 75 mg. of a solid. Vapor phase chromatograph of this material on Carbowax (20M) (a trademark of Union Carbide Corporation for a series of polyethylene glycols) gives a sample melting at 48°–49°C. Mass spectroscopy (70 ev) m/3 (decreasing relative intensity) 170, 169, 142, 42, 106, 171, 172, 64, 107, 66 and 144 mass units. The material is confirmed to be 2-methyl-4-chloro-5,7-dihydrofuro-3[3,4-d]-pyrimidine.

c. Preparation of 2-methyl-5,7-dihydrofuro-[3,4-d]-pyrimidine

A mixture of 0.075 g. (0.00044 mol) of 2-methyl-4-chloro-5,7-dihydro-[3,4-d]-pyrimidine, 0.12 g. (0.0018 mol) of zinc and 0.025 g. (0.00047 mol) of ammonium chloride is added to a mixture of 1.5 ml. of 95 percent ethanol and 0.5 ml. of water and reflux is begun. At the completion of the third hour and the fourth hour of reflux, an additional 0.075 g. of ammonium chloride is added and after five hours of reflux the mixture is cooled, filtered and the ethanol removed in vacuo yielding 20 mg. of residue. This residue is purified by chromatography on silica gel with dichloromethane and 1% methanol in dichloromethane as eluents. The solvents are removed in vacuo to yield 10 mg. of product which is further purified by dissolution in 1 ml. of pentane, filtration, and removal of the pentane in vacuo to yield 10 mg. of product. NMR in deuterochloroform shows 8.52 (1, s

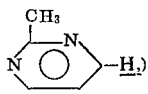

5.14 (2, s,

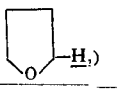

4.98 (2, t, J-2 cps.

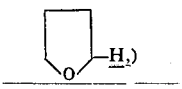

(3, s,

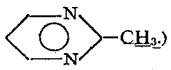

ppm and mass spectroscopy (70 ev) m/e (decreasing relative intensity): 136, 108, 42, 39 and 135 mass units. The material is confirmed to be 2-methyl-6,7-dihydrofuro-[3,4-d]-pyrimidine.

This compound has a cracker, popcorn, nut-like character and a sweet baked goods aroma. It is suitable for use in nut flavors.

EXAMPLE II

Preparation of 2,7-dimethyl-5,7-dihydrofuro-[3,4-d]-pyrimidine a. Preparation of 2,7-dimethyl-4-hydroxy-5,7-dihydrofuro-[3,4-d]-pyrimidines A mixture is prepared by adding 47.5 g. (0.503 mol) of acetamidine hydrochloride to sodium ethoxide in ethanol prepared by adding 11.5 g. (0.5 mol) of sodium to 270 ml. of ethanol and the mixture is then stirred under nitrogen for 10 minutes. To this mixture is added 79.1 g. (0.5 mol) of 2-methyl-4-carbomethoxy-tetrahydrofuran-3-one and the resulting mixture is kept at room temperature for 24 hours after which the ethanol is removed in vacuo and 100 ml. of water are added to the residue. The pH of the water mixture is adjusted to 7 with 8N hydrochloric acid and the mixture is then extracted thrice with 100 ml. portions of dichloromethane. The extract is dried over sodium sulfate, filtered and the dichloromethane removed in vacuo. The residue is triturated with hexane and filtered to yield 6.5 g. of crude product and further extraction (seven times with 100 ml. portions) of the water layer with dichloromethane yields an additional 4.4 g. of crude product. Recrystallization of the crude product from carbon tetrachloride yields 5.2 g. of a solid material with a melting point of 190°-203°C. IR (Nujol) shows absorptions at 5.95, 6.33, 7.60, 8.07, 8.63, 9.36, 9.67, 10.56, 10.72, 11.79, 12.32, 12.92 and 13.70 µ, Mass spectroscopy (70 ev) m/e (decreasing relative intensity): 42, 151, 108, 166, 43, 39, 138 and 124 mass units. The material is 2,7-dimethyl-4-hydroxy-5,7-dihydrofuro-[3,4-d]-pyrimidine.

b. Preparation of 2,7-dimethyl-4-chloro-5,7-dihydrofuro-[3,4-d]-pyrimidine

A mixture of 6.0 g. (0.0361 mol) of 2,7-dimethyl-4-hydroxy-5,7-dihydrofuro-[3,4-d]-pyrimidine are added to 24.0 ml. (0.262 mol) of phosphorus oxychloride and the mixture is refluxed for 135 minutes. About half of the phosphorus oxychloride is then removed in vacuo and the remaining mixture is added to ice. The resulting water mixture is then adjusted to a pH of 6 with 50 percent sodium hydroxide and then extracted thrice with 100 ml. portions of dichloromethane. The extract is dried over sodium sulfate, filtered and the dichloromethane removed in vacuo to yield 6.4 g. of crude product. This crude material is dissolved in a small volume of 1 percent methanol in dichloromethane and added to a column of 194 g. of silicic acid and elution with 1% methanol in dichloromethane, combination of fractions and removal of solvent in vacuo yields 4.13 of product. IR (Neat) gives readings of 3.38, 3.44, 3.52, 6.24, 6.44, 7.08, 7.75, 9.24, 11.38 and 11.82 µ. NMR in deuterochloroform shows 5.28 to 5.08 (3, overlapping multiplets,

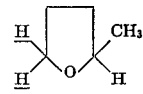

2.74 (3, s,

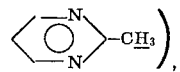

1.53 (3, d, J=6 cps,

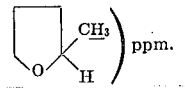 ppm.

Mass spectroscopy (70 ev) m/e (decreasing relative intensity): 169, 171, 43, 184, 42, 64, 141 and 142 mass units. The material is 2,7-dimethyl-4-chloro-5,7-dihydrofuro-[3,4-d]-pyrimidine.

c. Preparation of 2,7-dimethyl-5,7-dihydrofuro-[3,4-d]-pyrimidine

A mixture is prepared by adding 0.58 g. (0.0035 mol) of 2,7-dimethyl-4-chloro-5,7-dihydrofuro-[3,4-d]-pyrimidine, 0.92 g. (0.014 mol) of zinc and 0.20 g. (0.0037 mol) of ammonium chloride to a mixture of 9.0 ml. of 95 percent ethanol and 4.5 ml. of water and reflux is begun. At the completion of 100 minutes of reflux, 0.4 g. of ammonium chloride is added, at 240 minutes 0.5 g. of ammonium chloride is added, at 280 minutes 0.5 g. of zinc is added, and at 380 minutes an additional 0.2 g. of zinc is added. At the completion of reflux (410 minutes) the mixture is filtered, ethanol is removed in vacuo and the residue is dissolved in dichloroethane. This solution is dried over sodium sulfate, filtered and the solvent removed in vacuo leaving a liquid residue of 0.27 g. which is purified by vapor phase chromatography on a Carbowax (20 M) column to yield the product. IR (Neat) shows absorptions at 2.93, 3.38, 3.44, 3.52, 6.24, 6.36, 6.96, 7.09, 9.26, 9.56 and 11.71 µ. NMR in deuterochloroform shows 8.50 (1, s,

5.16 to 5.08 (3, overlapping multiplets

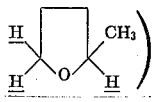

2.75 (β, s,

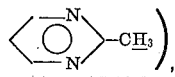

1.52 (3, d, J=6 cps,

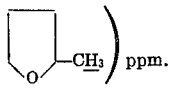  ppm.

Mass spectroscopy (70 ev) m/e (decreasing relative intensity): 135, 50, 108, 107, 39, 42, 43, 52 and 79 mass units. The material is 2,7-dimethyl-5,7-dihydrofuro-[3,4d]-pyrimidine.

This compound has a popcorn, cracker aroma and is suitable for use in sweet and salted baked goods and for nut and vanilla flavor.

EXAMPLE III

Preparation of 2,5,7-trimethyl-5,7-dihydrofuro-[3,4-d]-pyrimidine a. Preparation of 2,5,7-trimethyl-4-hydroxy-5,7-dihydrofuro-[3,4-d]-pyrimidine A mixture of 27.0 g. (0.157 mol) of 2,5-dimethyl-3-carbomethoxy-tetrahydrofuran-4-one and 15.3 g. (0.162 mol) of acetamidine hydrochloride are dissolved in 135 ml. of 95 percent ethanol at room temperature. 11.2 g. (0.081 mol) of potassium carbonate are added and the mixture is allowed to stand at room temperature for sixteen hours and is then heated to reflux for a period of seven hours and allowed to stand again at room temperature for 64 hours. The solvent is then removed in vacuo, 40 ml. of water are added and the solution is adjusted for pH of 7 with 4N hydrochloric acid. The mixture is then extracted four times with 55 ml. portions of dichloromethane, dried over sodium sulfate, filtered and the solvent removed in vacuo. The solid residue is triturated with carbon tetrachloride and filtered to yield 5.2 g. of a white solid. The mother liquor is then reduced in volume, cooled and filtered to yield an additional 0.7 g. of product resulting in a total yield of 5.9 g. of product. IR (Nujol) shows absorptions at 6.06, 7.62, 8.62, 9.41, 9.91, 10.68, 11.88, 12.57, and 13.36 μ. NMR in deuterochloroform shows 5.44 to 4.98 (2, overlapping multiplets,

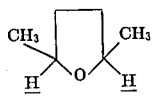

2.51 (3, s,

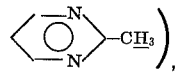

1.47 (6, t, J=6 cps.

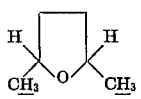

Mass spectroscopy (70 ev) m/e (decreasing relative intensity 165, 42, 43, 180, 124, 138, 137 and 96 mass units. The product is 2,5,7-trimethyl-4-hydroxy-5,7-dihydrofuro-[3,4-d]-pyrimidine.

b. Preparation of 2,5,7-trimethyl-4-chloro-5,7-dihydrofuro-[3,4-d]-pyrimidine

A mixture of 4.50 g. (0.0250 mol) of 2,5,7-trimethyl-4-hydroxy-5,7-dihydrofuro-[3,4-d]-pyrimidine and 18.0 ml. (0.196 mol) of phosphorus oxychloride is heated at reflux for 90 minutes. 16 ml. of the phosphorus oxychloride are then removed in vacuo and the resulting thick residue is dissolved in 50 ml. of chloroform and 10 ml. of water are added followed by the addition of 12.6 ml. of ammonium hydroxide while the temperature is maintained below 40°C. The pH of the mixture is then adjusted to 8 and the salts that have formed are removed and the aqueous phase is then separated and extracted thrice with 15 ml. portions of chloroform. The combined extracts are then dried over sodium sulfate, filtered and the chloroform removed in vacuo. The residue is then triturated with hexane, filtered and the hexane is removed in vacuo to yield 2.49 g. of a liquid residue. This material is chromatographed on 75 g. of silicic acid with dichloromethane as the eluent and then the fractions are combined and the solvent removed in vacuo yielding 0.80 g. of material. IR (Neat) shows absorptions at 3.40, 3.46, 3.52, 5.76, 6.28, 6.46, 7.07, 9.27, 10.61, 11.04, 11.42 and 11.92 μ. NMR in deuterochloroform shows 6.52 to 5.04 (2, overlapping multiplets

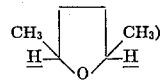

2.63 (3, s, J=4 cps,

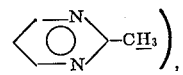

1.56 (six overlapping doublets

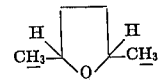

Mass spectroscopy (70 ev) m/e decreasing relative intensity): 183, 185, 43, 42, 78, , 52, 155, 147, 156, 39, 41, 198 and 197 mass units. The material is 2,5,7-trimethyl-4-chloro-5,7-dihydrofuro-[3,4-d]-pyrimidine.

c. Preparation of 2,5,7-trimethyl-5,7-dihydrofuro-[3,4-d]-pyrimidine

A mixture of 0.70 g. (0.0035 mol) of 2,5,7-trimethyl-4-chloro-5,7-dihydrofuro-[3,4-d]-pyrimidine, 0.92 g. (0.0014 mol) of zinc and 0.095 g. (0.0018 mol) of ammonium chloride are added to a mixture of 7.0 ml. of 95 percent ethanol and 4.5 ml. of water and reflux is begun. At the completion of 120 minutes of reflux, 0.10 g. of ammonium chloride are added and at 180 minutes 0.20 g. of ammonium chloride are added. At the completion of reflux the mixture is filtered, and the solvent and water are removed in vacuo to yield 0.42 g. of material. IR (Neat) shows absorptions at 3430, 2960, 2890, 2840, 1599, 1580, 1450, 1432, 1410, 1074, 1023, 930, 891, 848, 797 and 761 cm⁻¹. NMR in deuterochloroform shows 8.43 (1, s,

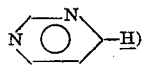

5.50 to 4.94 (2, overlapping multiplets

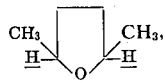

2.74 (β, s,

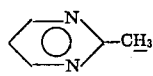

(6, d, J=6 cps.

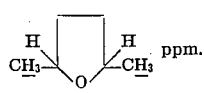 ppm.

Mass spectroscopy (70 ev) m/e (decreasing relative intensity): 149, 43, 42, 164, 52, 121, 53, 150, 122, 51 and 163 mass units. The material is 2,5,7-trimethyl-5,7-dihydrofuro-[3,4-d]-pyrimidine. This material has a sweet cereal note.

EXAMPLE IV

A cake flavor is prepared by admixing the following ingredients:

|  | Parts |
|---|---|
| Vanilla | 40 |
| Ethylvanillin | 15 |
| Benzodihydropyrone | 5 |
| Rum Ether | 5 |
| Alcohol (95%) | 235 |
| Propylene Glycol | 400 |
| Water | 300 |
| 2,7-dimethyl-5,7-dihydrofuro-[3,4-d]pyrimidine | 40 |

The above flavor is added to a prepared cake mix (1 oz./100 lbs.) and upon baking the resultant cake has a sweet milk and egg-like taste, more so than a cake prepared with the above flavor not containing the pyrimidine material.

What is claimed is:

1. A process for altering the flavoring of a foodstuff which comprises adding thereto a small but flavor-altering amount of at least one oxocyclic pyrimidine having the formula

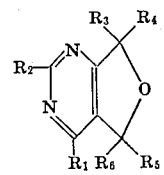

wherein $R_1$ is alkyl containing from one to six carbon atoms or hydrogen; $R_2$, $R_3$, $R_4$, $R_5$ and $R_6$ are the same or different and are hydrogen or alkyl containing from one to six carbon atoms.

2. A process as claimed in claim 1 wherein $R_2$ is methyl and $R_1$, $R_3$, $R_4$, $R_5$ and $R_6$ are hydrogen.

3. A process as claimed in claim 1 wherein $R_2$ and $R_3$ are methyl and $R_1$, $R_4$, $R_5$ and $R_6$ are hydrogen.

4. A process as claimed in claim 1 wherein $R_2$, $R_3$ and $R_5$ are methyl and $R_1$, $R_4$ and $R_6$ are hydrogen.

* * * * *